Aug. 3, 1965

G. SCHNEIDER 3,198,492

BLENDING APPARATUS

Filed Sept. 17, 1962

INVENTOR.
GEORGE SCHNEIDER

BY

ATTORNEYS

Aug. 3, 1965  G. SCHNEIDER  3,198,492
BLENDING APPARATUS
Filed Sept. 17, 1962  2 Sheets-Sheet 2
FIG. 2
FIG. 5
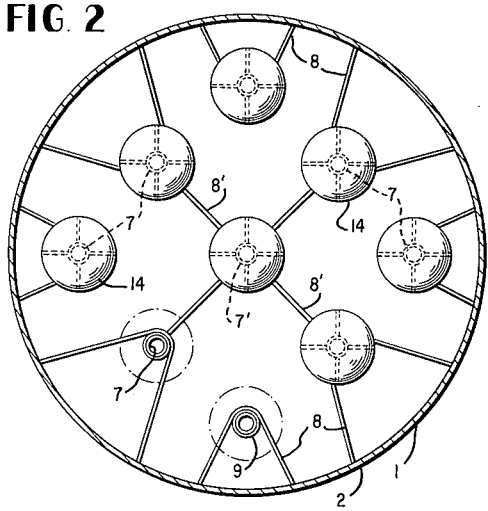
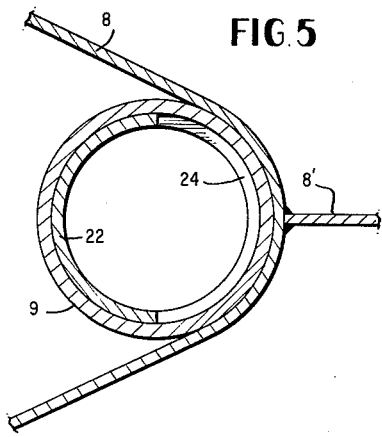
FIG. 6
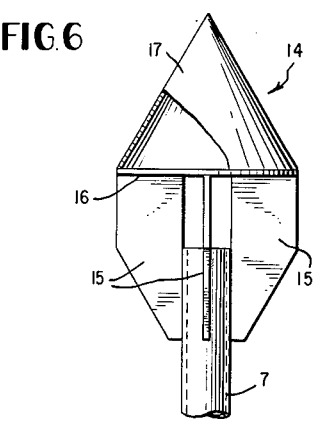
FIG. 7
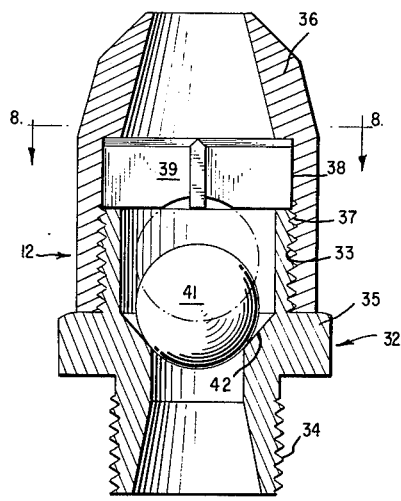
FIG. 8
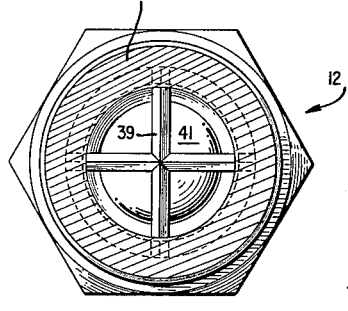
INVENTOR.
GEORGE SCHNEIDER
BY
ATTORNEYS

1

3,198,492
BLENDING APPARATUS
George Schneider, Cleveland, Ohio, assignor to Fuller Company, a corporation of Delaware
Filed Sept. 17, 1962, Ser. No. 224,053
7 Claims. (Cl. 259—95)

This invention relates to an apparatus for quickly and uniformly blending discrete particles of materials, and is more particularly concerned with the blending of pelleted and particulate material, such as solid plastics.

General types of apparatus are known for blending relatively finely-divided material, such as powdered polyethylene, polypropylene, cement, and the like. One type of such apparatus blends pulverulent or ground material in a bin by aerating portions of the material directly beneath the mouth of vertically disposed conveying tubes extending up through the mass of material to above the surface thereof in the bin, and entraining the aerated material and conveying it up through the tube to fall to the surface of the mass of material in the bin. These systems are typified by the patent to Goebbels No. 2,125,913 and the patent to Peters No. 2,723,838.

The present invention contemplates a blending system in which the loose solid material is quickly and uniformly blended, and which may be operated for long periods of time without damage, or may be operated intermittently without clogging or obstructing the gas delivery system.

During the blending operation, the mass of loose, discrete particles of material gradually descends in the bin, sliding along the outer surface of the conveying tubes and frictionally heating the tubes. Since most loose solid materials are poor heat conductors, the heat from this, as well as from other sources, such as compression of the aerating fluid, tends to build up, causing the tubes to expand. The lateral expansion of the tubes is small and presents little problem. However, the longitudinal expansion of the tubes is substantial during extended operation of the blending apparatus and has presented a real problem. In a large blender, such as this invention contemplates, the longitudinal expansion of the tubes tends to bend or buckle the tubes between their supporting brackets and to break the brackets both from the tubes and from the sides of the bin to which they are attached.

The present invention provides expansion joints in the tubes at appropriate points, thereby enabling the tubes to expand longitudinally, without buckling or breaking of tubes or supports.

The present invention also provides means whereby clogging of the gas supply system by the loose solid materials during the quiescent state of intermittent operation of the system is prevented.

In general, the preferred form of the present invention comprises a bin adapted to contain loose, discrete particles of material, with a space between the surface of the mass of material and the top of the bin. Conveying tubes are supported within the bin at a plurality of points along the tube, with the upper end of each tube disposed above the surface of the material in the bin. Expansion joints are provided for each conveying tube for permitting longitudinal expansion of each tube relative to the side wall of the bin. Nozzles, one for each conveying tube, are disposed adjacent the lower end of the tube and are connected to a source of fluid under pressure which is discharged through each of the nozzles to aerate the material between the nozzle and the end of the associated conveying tube and to carry the aerated material upwardly through the conveying tube. A check valve for each nozzle is disposed in the fluid passage through the nozzle.

The expansion joints and supports for each conveying tube comprise a bracket supported at one end within the bin, and a sleeve, for receiving end portions of the conveying tubes, attached to the other end of the bracket. Each of the conveying tubes comprises a plurality of sections of tube, the end portions of each section being disposed within the sleeve one above the other, and normally spaced from one another. The lower end portion of the upper tube section within each sleeve is attached to and sealed to the sleeve. Thus, the lower end portion of each upper section of conveying tube is supported by the bracket and sleeve, while the upper end of a lower tube section is free to slide with the next sleeve as the section expands.

The nozzle and check valve comprise a vertically-disposed substantially tubular housing in which is a ball substantially smaller in diameter than the interior diameter of the housing, which normally rests on a valve seat in the housing to prevent back flow of material through the housing. Means are provided within the housing and above the ball for restricting the upward movement of the ball in the housing while permitting the flow of pressurized fluid about the ball, through the housing, and out the upper end of the housing. Thus, when the flow of fluid stops, the ball will fall back onto the valve seat and prevent any material from entering and clogging the fluid supply line.

The invention will be more fully described in connection with the accompanying drawings, in which:

FIG. 2 is a cross-sectional view, partially broken away, taken on lines 2—2 of FIG. 1;

FIG. 5 is a cross-sectional view taken on line 5—5 of FIG. 3;

FIG. 6 is a side elevational view, partly broken away, of the upper end portion of a conveying tube and its deflector;

FIG. 7 is a longitudinal cross-sectional view of the check valve; and

FIG. 8 is a horizontal sectional view of the check valve, taken on line 8—8 of FIG. 7.

Figure 1:
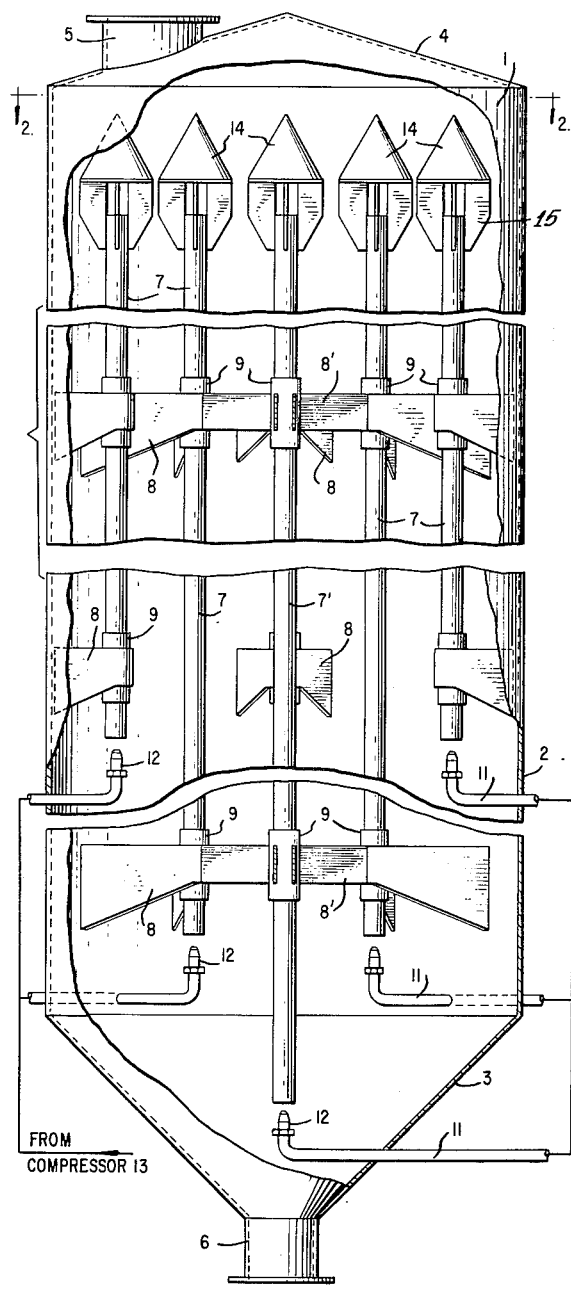
FIG. 1 is a side elevational view, partially broken away, of the blending apparatus, with the aerating fluid supply system schematically illustrated.

As illustrated in the drawings, the blending apparatus comprises a bin 1 having a generally cylindrical, vertically disposed side wall 2, a conical bottom wall 3, and a top wall 4. Typically, these large bins are made of welded steel plates. An inlet opening is provided in the top wall 4, and an inlet collar 5 is welded or otherwise secured about this opening to receive the loose, discrete particles of the solid material. An outlet opening 6 is provided at the apex of the conical bottom wall 3, through which blended loose solid materials are discharged, preferably into a conveyor (not shown).

A plurality of conveying tubes 7 are supported within the bin by brackets 8 supported from the walls of the bin, as shown in FIG. 2. For proper blending the conveying tubes 7 preferably are spaced approximately equally from one another and from the side wall of the bin. The brackets supporting the outer ring of conveying tubes are generally V-shaped, the free legs of each V being welded or otherwise attached to the side wall 2 and the apex passing around and being welded or otherwise secured to a support member comprising a sleeve or collar 9 which surrounds and supports the conveying tube. The collars 9 form a part of the expansion joints, which are more fully described hereinafter. A central conveying tube 7' is supported at approximately the vertical axis of the bin by a cross-work of brackets 8', each attached at one end to the rounded apex of one of the lateral V-shaped brackets 8 and, at the other end, to a sleeve or collar 9' supporting the central conveying tube.

The supporting brackets are necessarily quite strong, for the material that flows down past the outside of the conveying tubes during the blending operation tends to pull the conveying tubes downwardly with them, due to the high frictional resistance between the material and the outer walls of the conveying tubes. This may be compared to trying to pull a post through sand. If the post is loose in a hole in the ground, it is quite easy to pull it out of the hole, but if sand is loosely poured between the post and the sides of the hole, it is much more difficult to move the post past the sand and pull the post out of the hole. Similarly, the descending bed of material is moving relatively to the conveying tube during the blending operation, and the brackets must be quite strong to resist the frictional loading of the materials on the conveying tubes which tends to pull the tubes along with the descending materials.

The conveying tubes 7 are supported within the bin to position their upper ends, or outlets, generally in the same horizontal plane spaced below the top wall 4 of the bin and above the maximum level of the pulverulent material within the bin. The conveying tubes are of several different lengths, and extend down into the material to terminate at different levels. Thus, if different qualities, colors, batches or grades of pulverulent material have been poured into the bin, in different strata, the lower end or inlet of the conveying tubes are located at different levels or strata of the material.

A plurality of supply lines 11 for pressurized fluid, such as gas or air, extend through and are secured to the side wall or bottom of the bin, and each terminates in a vertically-directed end portion spaced below the inlet of an associated conveying tube. A nozzle assembly 12 is threaded onto the end portion of each gas supply line 11 within the bin, and directs the pressurized gas from the supply line into the material about the inlet of the conveying tube to aerate the material to a high degree and to entrain it and carry it up through the associated conveying tube. The nozzle assembly 12 is described in greater detail below. Compressed gas or air is supplied to the gas supply lines 11 and to the nozzle assemblies 12 by a suitable compressor 13. If powdered polyethylene, polypropylene, or the like is being blended, the inside of each conveying tube preferably is sand-blasted or otherwise treated to prevent ribboning of the material, as described in Schneider Patent No. 2,784,038.

A deflector 14 is attached to the upper end portion of each conveying tube. Each deflector consists of a plurality of vertical supporting plates 15 attached about and extending above the upper end portion of the conveying tube. A horizontal disc 16 is attached to the upper end of plates 15, as by welding, and thus is positioned directly over and spaced from the outlet of the conveying tube by the plates. The aerated material passing through the conveying tube and issuing from the outlet strikes the disc 16, rebounds outwardly past the vertical supporting plates, and rains down over the surface of the material in the bin. The rim of a conical hood 17 is attached to the outer edge of each of the discs 16, and extends above the discs to deflect incoming material away from the outlet of the conveying tubes and prevent the incoming material from spilling into the conveying tube and clogging it. Also, the conical hood prevents material from collecting on top of the disc 16, which otherwise would not be blended evenly and would contaminate the blended pulverulent material upon subsequent falling into the body of material in the bin.

When the material lying at different levels or strata within the mass in the bin is aerated, blown through the conveying tubes, and rebounded from the deflector, the material from different levels or strata of material is dispersed and rains down on the surface of the material in the bin. As it rains down, it is uniformly mixed with and provides a new surface on the mass that is a relatively uniform blend of the materials at different levels or strata within the bin. Thus, after at most a few blending cycles, the material within the bin is uniformly blended.

Figure 3:
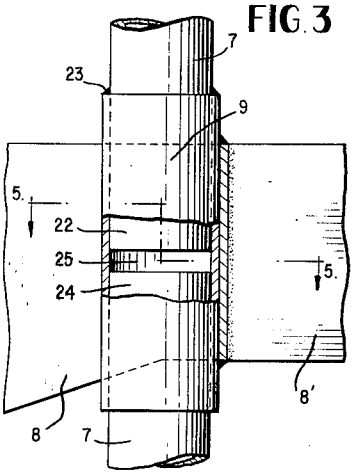
FIG. 3 is a side elevational view, partially broken away, of the expansion joint.
Figure 4:
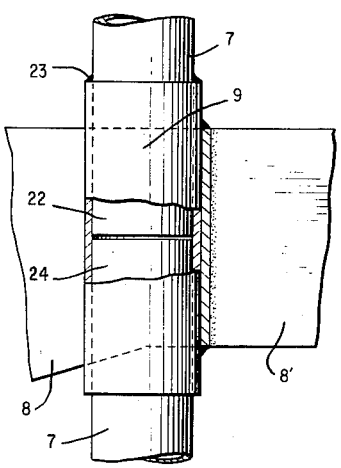
FIG. 4 is a view similar to FIG. 3 of the expansion joint in a different position.

During the blending operation, the conveying tubes expand, for reasons previously described. To provide for such expansion, expansion joints, including collars 9, attached to the conveying tube and to the brackets 8, are provided to position and support the conveying tube within the bin, as well as to allow for the expansion of the conveying tube. As illustrated in FIGS. 3–5, each expansion joint consists of one of the collars or sleeves 9 whose inside diameter is slightly greater than the outside diameter of the conveying tube. This sleeve is attached to the supporting bracket, as by welding. The lower end portion 22 of an upper section of the conveying tube extends into the sleeve and is attached to the sleeve perferably by a weld 23 about the upper end of the sleeve. The weld not only securely holds this portion of the conveying tube to the sleeve, but also serves to deflect materials sliding down along the conveying tube from the sleeve, and seals the space between the conveying tube and the sleeve to prevent the loose, discrete particles of material from clogging it and the expansion joint. The upper end portion 24 of the lower section of conveying tube is journaled into the sleeve, but is not attached in any way to the sleeve, and, therefore, may move longitudinally within the sleeve as the section expands. This end portion is positioned within the sleeve during assembly, and when the conveying tubes are at room temperature, terminates short of the lower end of the upper section of conveying tube within the sleeve, to provide an expansion gap 25 between the ends as shown in FIG. 3.

During operation, the materials are highly aerated and are entrained by the gaseous blast from the nozzles 12 and are blown upwardly through the conveying tubes to strike the discs of the deflectors and to rebound downwardly and outwardly and be scattered across the surface of the bed of material. Simultaneously, the material bed or mass within the bin is slowly moving downwardly in the bin, due to the material being removed from lower levels through the conveying tubes. The aerating gas, heated by its compression, and the friction of the pulverulent material sliding along the inside of the conveying tube, tend to heat the tube. Also, the heat caused by the friction of the material sliding downwardly along the outside of the tube may cause a substantial heating of the tube. This composite heating, aggravated by the poor heat conductivity of the surrounding loose material, is sufficient to cause the conveying tubes to expand. Accordingly, the expansion joints along the length of the conveying tube, while adequately supporting the conveying tubes, accommodate this expansion and prevent the conveying tubes from bending, or breaking their supports.

As the sections of the conveying tube heat up and expand during extended operation of the blending apparatus, the upper end portion 24 of each lower section of conveying tube within an expansion joint is free to expand and slide upwardly into the expansion gap 25 to reach a position illustrated in FIG. 4, while sleeves 9 and their brackets securely hold the ends of the sections of the conveying tubes against the deflecting force of the pulverulent material sliding downwardly along the outside of the tubes. Thus, the conveying tubes are free to expand within sleeves or collars 9, while being securely held by the expansion joints and brackets against deflection. Furthermore, due to this construction, the material flowing around the expansion joints tends to flow on downwardly past the tubes, due in part to the natural flow of the material and in part to the slight escape of air out through the expansion joint, tending to blow any stray material outwardly away from the joint, and thereby cleaning it.

As shown in FIGS. 7 and 8, each of the nozzles 12 includes a check valve which comprises a tubular member 32 externally threaded at both end portions 33 and 34, and having an outwardly-extending center portion 35 providing a shoulder adjacent the inner end of each threaded end portion. A nozzle throat 36 is threaded onto the outer end portion 33 of the tubular member to abut against the shoulder formed by center portion 35. As best shown in FIG. 7, the cylindrical, partially-threaded recess 37 in the nozzle throat 36 is of greater length than the length of threaded end portion 33 of the tubular member 32, thereby providing a space 38 between the end of the tubular member and the base of the cylindrical recess 37 in the nozzle throat 36. A cross member 39 is provided to limit the outward movement of a ball 41. The cross bars of the cross member 39, which are of the same length as the diameter of cylindrical recess 37, lie within the space 38, and when the tubular member 32 is threaded into the nozzle throat 36, the cross member 39 is securely held by these members. The ball 41 is confined between a valve seat 42 provided in tubular member 32 and the cross member 39.

As shown in FIG. 1, the nozzles having the ball check valves are positioned vertically beneath the lower ends of the tubes 7, with the nozzle throat 36 above tubular member 32. In this position, the ball 41 rests on the valve seat 42 in the tubular member, and prevents any material which falls into the nozzle and past the cross member 39 during the period the supply of pressurized gas is shut off from entering the pressurized gas line threadedly attached to the tubular member 32 about end portion 34. When pressurized gas is supplied through the gas line to the nozzles, the ball 41 is forced against any material clogging the nozzle, and is at least partially unseated, permitting pressurized gas to flow around the ball, aerating and blowing out the material clogging the nozzle. The force of the pressurized gas quickly frees the ball 41 and forces it upwardly against the cross member 39. In this state, the pressurized gas freely flows from the nozzle, aerates the overlying material beneath the tubes 7 and blows it upwardly through conveying tubes 7 to be discharged from their upper ends. When the gas flow through the nozzles stops, the ball drops back to its seat about the gas inlet before the previously aerated pulverulent material drops into the nozzle and about the ball.

A nozzle of the type described above is particularly effective when the material being blended is of very small particle size.

Various changes may be made in the details of construction of the blending apparatus herein described without departing from the invention or sacrificing any of the advantages thereof, the scope of the invention being set forth in the appended claims.

I claim:

1. A blending apparatus for blending discrete particles of solid material comprising a bin adapted to contain the solid material and to provide a space between the surface of the material and the top of the bin, conveying tubes within said bid, said bin and tubes extending in a generally vertical direction and the lower ends of at least some of the tubes being positioned at different horizontal levels, a rigid expansion means for permitting longitudinal movement of each of said conveying tubes relative to the side wall of the bin, a nozzle for each conveying tube adjacent one end thereof and positioned to direct a fluid stream therethrough, and means for passing fluid under pressure through said nozzles.

2. A blending apparatus as set forth in claim 1, in which at least some of the tubes are of different length, and the upper ends of the tubes are at substantially the same horizontal level.

3. A blending apparatus as set forth in claim 1, in which the tubes comprise a plurality of longitudinal sections, and the expansion means provides for movement of one section longitudinally with respect to an adjacent section.

4. A blending apparatus for blending discrete particles of solid material comprising a bin extending in a generally vertical direction, adapted to contain the solid material and to provide a space between the surface of the material and the top of the bin, conveying tubes with their longitudinal axes in a generally vertical direction positioned within said bin, means for supporting each of said conveying tubes within the bin, a rigid expansion means for permitting longitudinal movement of each of said conveying tubes relative to the side wall of said bin, the conveying tubes are supported by support members from the wall of the bin at at least one position, the expansion means for each tube is formed in one of said support members for each tube, a nozzle for each conveying tube adjacent and beneath the lower ends thereof and positioned to direct a fluid stream therethrough, and means for passing fluid under pressure through said nozzles.

5. A blending apparatus as set forth in claim 4, in which said conveying tubes are formed of a plurality of longitudinal sections, said means for supporting each of said conveying tubes comprises a plurality of brackets supported at one end from the wall of the bin, said expansion means comprises sleeves supported by said brackets for receiving end portions of said conveying tubes, end portions of certain sections of the conveying tubes being disposed within the sleeves, one above the other and normally spaced from one another, and means attaching and sealing to each of the sleeves the end portion of only one tube section, the end portion of the other tube section in each sleeve being free to move longitudinally relative to the sleeve.

6. In a blending apparatus for blending discrete particles of solid material including a bin adapted to contain the material and to provide a space between the surface of the material and the top of the bin, conveying tubes of different lengths supported at a plurality of points therealong and within the bin, with one end of each tube disposed within said space, a nozzle for each conveying tube adjacent the other end thereof and positioned to direct a fluid stream therethrough and a pressure responsive check valve for each nozzle disposed in the fluid passage through the nozzle; the improvement in the means for supporting the conveying tubes within the bin which comprises brackets fixedly supported at one end within the bin, a sleeve attached to said brackets and receiving within them the conveying tubes, each of said conveying tubes comprising a plurality of longitudinal sections, the end portions of certain of said sections being disposed within said sleeves, one above the other and normally spaced one from the other, and means for attaching and sealing to the sleeves only the lower end portion of an upper tube section, the upper end portions of the lower tube sections being movable longitudinally in said sleeves and relative thereto.

7. In a blending apparatus as set forth in claim 6, in which said means for attaching and sealing to the sleeves only the lower end portions of the tubes comprises a continuous weld about the upper end of the sleeves and between the sleeves and the lower end portions of the supported sections of the conveying tubes.

References Cited by the Examiner

UNITED STATES PATENTS

| | | | |
|---|---|---|---|
| 1,369,198 | 2/21 | Slomer | 285—417 X |
| 1,380,067 | 5/21 | Koch. | |
| 1,564,598 | 12/25 | Maanum | 239—571 X |
| 1,811,277 | 6/31 | Mosley | 285—417 X |
| 1,813,285 | 7/31 | Galetschky | 239—571 X |
| 2,344,150 | 3/44 | Judell | 239—571 X |
| 2,580,715 | 1/52 | Baber | 165—81 |
| 2,832,703 | 4/58 | Bell | 134—94 X |

FOREIGN PATENTS 102,474   12/16   Great Britain.

CHARLES A. WILLMUTH, *Primary Examiner.*

GEORGE J. NORTH, *Examiner.*